US006005593A

United States Patent [19]

Yoshinaga et al.

[11] Patent Number: 6,005,593

[45] **Date of Patent: *Dec. 21, 1999**

[54] RECORDING APPARATUS

[75] Inventors: Kenji Yoshinaga, Tokyo; Kunihiko Matsuzawa, Kawasaki; Masaharu Nemura, Yokohama; Kiyotaka Ohsumi, Tokyo, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/465,565

[22] Filed: Jun. 5, 1995

Related U.S. Application Data

[63] Continuation of application No. 07/933,697, Aug. 24, 1992, abandoned.

[30] Foreign Application Priority Data

Aug. 27, 1991 [JP] Japan .................................... 3-238852

[51] Int. Cl.$^{6}$ ..................................................... G01D 15/24

[52] U.S. Cl. ............................................ 346/134; 347/104

[58] Field of Search .................................... 346/134, 145; 400/58, 649; 347/104; 271/274, 273

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,620,807 | 11/1986 | Polit ...................................... 400/58 X |
| 4,692,778 | 9/1987 | Yoshimura et al. .................... 346/145 |
| 4,723,129 | 2/1988 | Endo et al. . |
| 4,740,796 | 4/1988 | Endo et al. . |
| 4,893,137 | 1/1990 | Ebinuma et al. . |
| 5,467,114 | 11/1995 | Ebinuma et al. . |
| 5,552,812 | 9/1996 | Ebinuma et al. . |
| 5,760,802 | 6/1998 | Ebinuma et al. . |

FOREIGN PATENT DOCUMENTS

| | | |
|---|---|---|
| 0382023 | 8/1990 | European Pat. Off. . |
| 0441425 | 8/1991 | European Pat. Off. . |
| 2749004 | 5/1979 | Germany . |
| 54-056847 | 5/1979 | Japan . |
| 59-091064 | 5/1984 | Japan ...................................... 347/29 |
| 59-138461 | 8/1984 | Japan . |
| 60-071260 | 4/1985 | Japan . |
| 63-042883 | 2/1988 | Japan . |
| 1-95353 | 6/1989 | Japan . |
| 59123670 | 7/1989 | Japan . |
| WO8604021 | 7/1986 | WIPO . |

*Primary Examiner*—N. Le
*Assistant Examiner*—Judy Nguyen
*Attorney, Agent, or Firm*—Fitzpatrick, Cella, Harper & Scinto

[57] ABSTRACT

A recording apparatus comprises transporting rollers for transporting a recording medium in a sandwiched state; a platen for supporting the recording medium at a recording position; and a releasing mechanism for moving the platen from a position at which the platen is located during a recording operation and releasing the recording medium sandwiched by the transporting rollers.

4 Claims, 5 Drawing Sheets

RECORDING APPARATUS

This application is a continuation of application Ser. No. 07/933,697 filed Aug. 24, 1992, now abandoned.

BACKGROUND OF THE INVENTION

1. Field of the Invention

The present invention relates to a recording apparatus for use in a printer, copier, facsimile apparatus and so on for recording an image on a recording medium such as paper, plastic sheet and so on.

2. Related Background Art

Generally, a recording apparatus having a recording mechanism of ink jet type, a heat-sensitive transfer recording mechanism, or the like performs a recording operation while scanning the recording mechanism relative to a recording medium to generate a two-dimensional image.

The structure of this mechanism, for example, provided in an ink jet recording apparatus, is such that recording media 51 stacked in a cassette 50 are one-by-one fed out by a pick-up roller 52, and sandwiched and transported by a pair of transporting rollers 53*a*, 53*b* and a pair of discharging rollers 54*a*, 54*b*, as shown in FIG. 6. A carriage 56 is reciprocally moved in the direction perpendicular to the surface of FIG. 6 relative to the recording medium 52 which has the rear surface supported by a platen 55, while ink is discharged from a recording head 57 mounted on the carriage 56.

In the above-mentioned structure, however, the ink jet head 57 faces the recording medium 51 from above the transporting roller pair 53*a*, 53*b* and the discharging roller pair 54*a*, 54*b*, and is scanned at a location close to the platen 55 which is positioned at a height substantially equal to nips of both roller pairs 53*a*, 53*b* and 54*a*, 54*b*, whereby if an abnormal transportation (jam) of the recording medium occurs in course of a recording operation and the recording operation is to be stopped to treat the jam, the following problems arises:

(1) When the upper rollers 53*b*, 54*b* of the transporting roller pair and the discharging roller pair are to be moved upwardly for facilitating the removal of the recording medium 51 from both roller pairs 53*a*, 53*b*, and 54*a*, 54*b*, the carriage 56 touches these upper rollers. Thus, a sufficient space cannot be assured for the rollers 53*b*, 54*b* to move in order to release the roller pressure. A sufficient space can neither be assured for treating the jammed recording medium 51, thereby making the jam recovery treatment difficult.

(2) When a jam occurs, the recording medium 51 on the platen 55 may often be raised off the platen 55. If the carriage 56 is returned to the home position, an ink discharging surface of the recording head 57 may be rubbed by the recording medium 51, which possibly leads to damaging nozzle tips of the recording head 57.

SUMMARY OF THE INVENTION

It is an object of the present invention to provide a recording apparatus for solving the above-mentioned conventional problems which maintains a high recording quality and reliability and facilitates the maintenance.

It is another object of the present invention to provide a recording apparatus which allows the operator to easily remove a jammed recording medium without damaging recording means.

It is a further object of the present invention to provide a recording apparatus which has transporting means for transporting a recording medium in a sandwiched state; supporting means for supporting the recording medium at a recording position; and releasing means for moving the supporting means from a position at which the supporting means is located during a recording operation and releasing the recording medium sandwiched by the transporting means.

DETAILED DESCRIPTION OF PREFERRED EMBODIMENTS

Embodiments according to the present invention applying the foregoing means will now be described.

Figure 1:
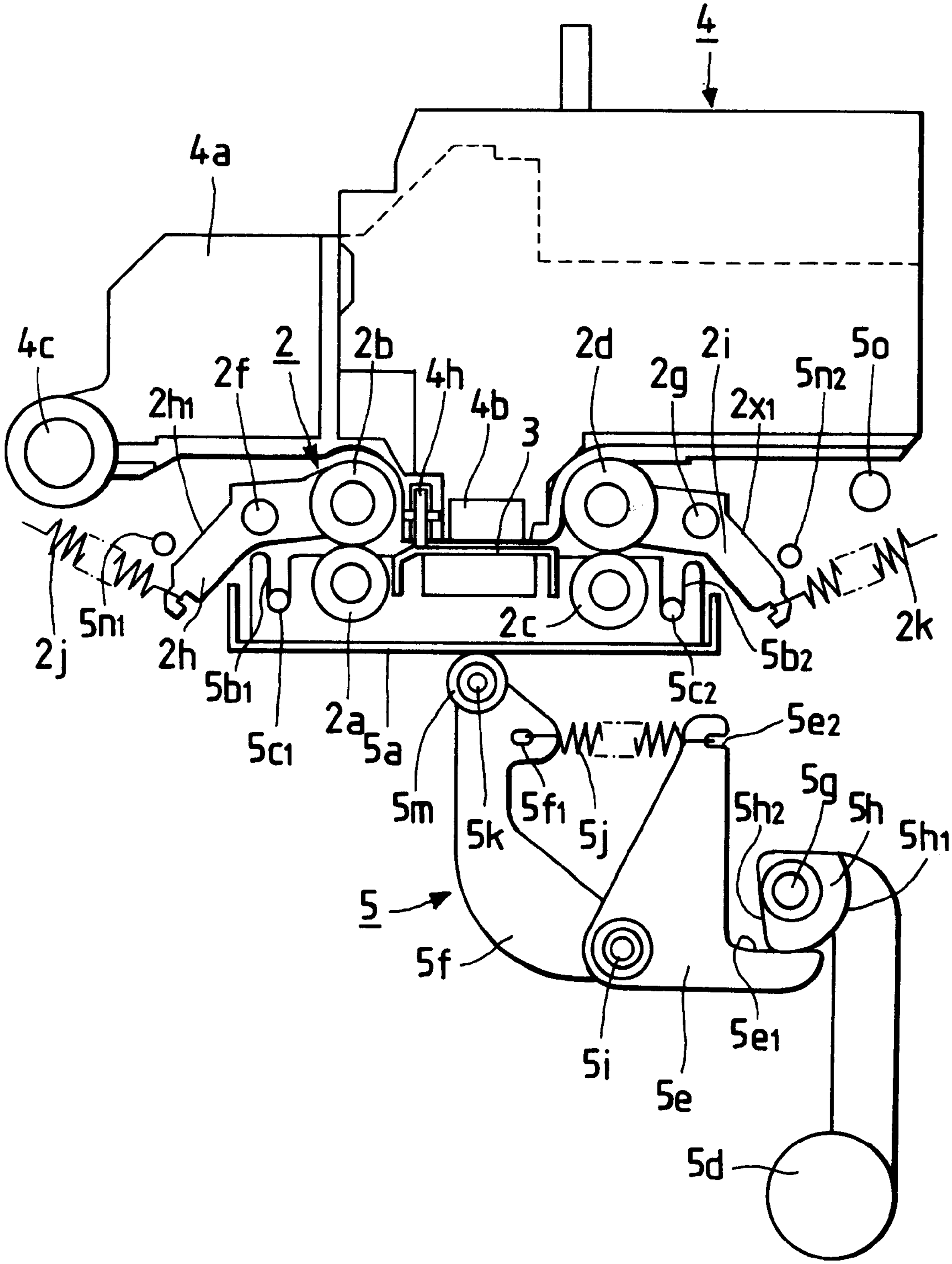
FIG. 1 is a cross-sectional view for explaining a main portion of a recording apparatus according to an embodiment of the present invention.
Figure 2:
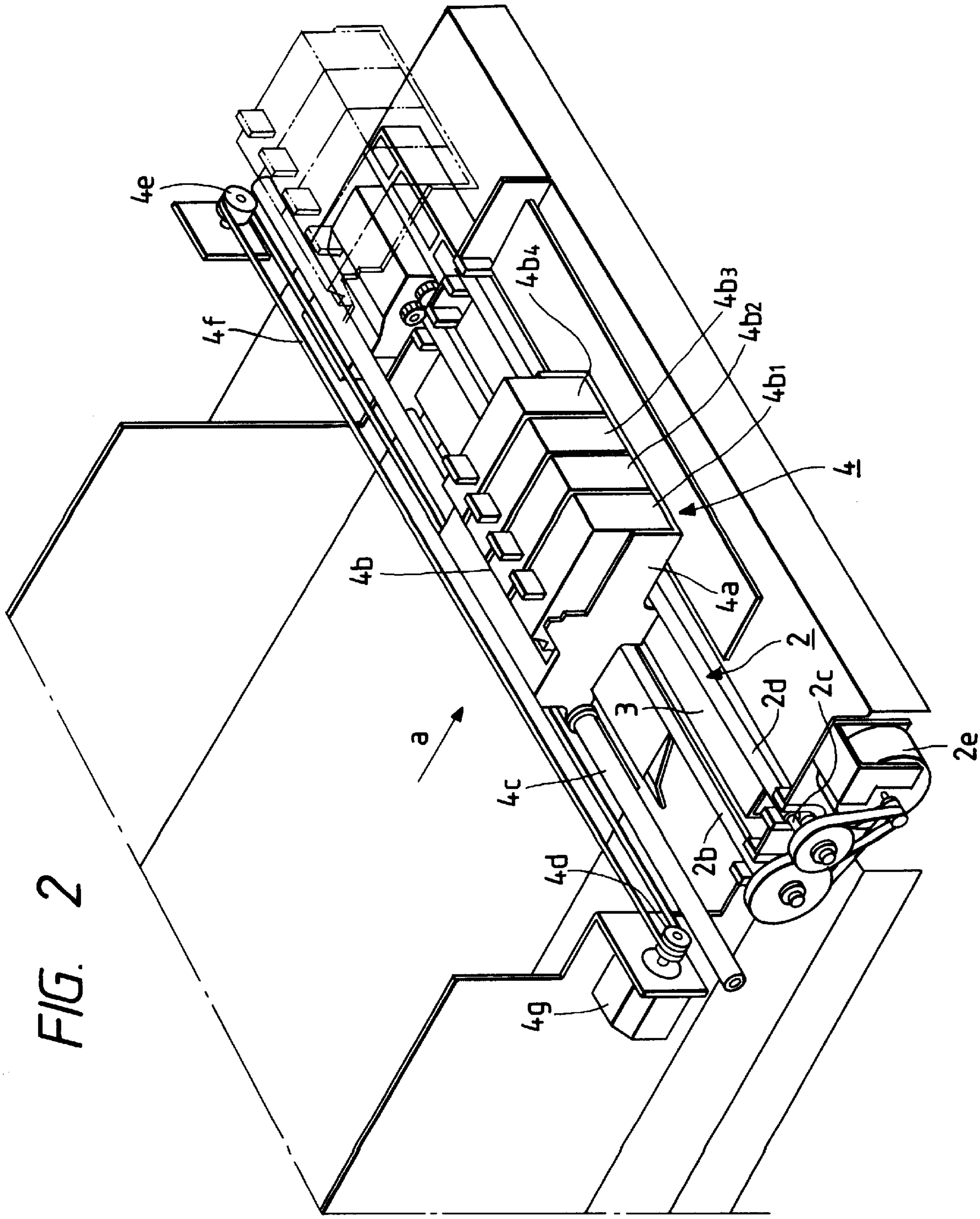
FIG. 2 is a perspective view for explaining the interior of the recording apparatus of the embodiment.
Figure 3:
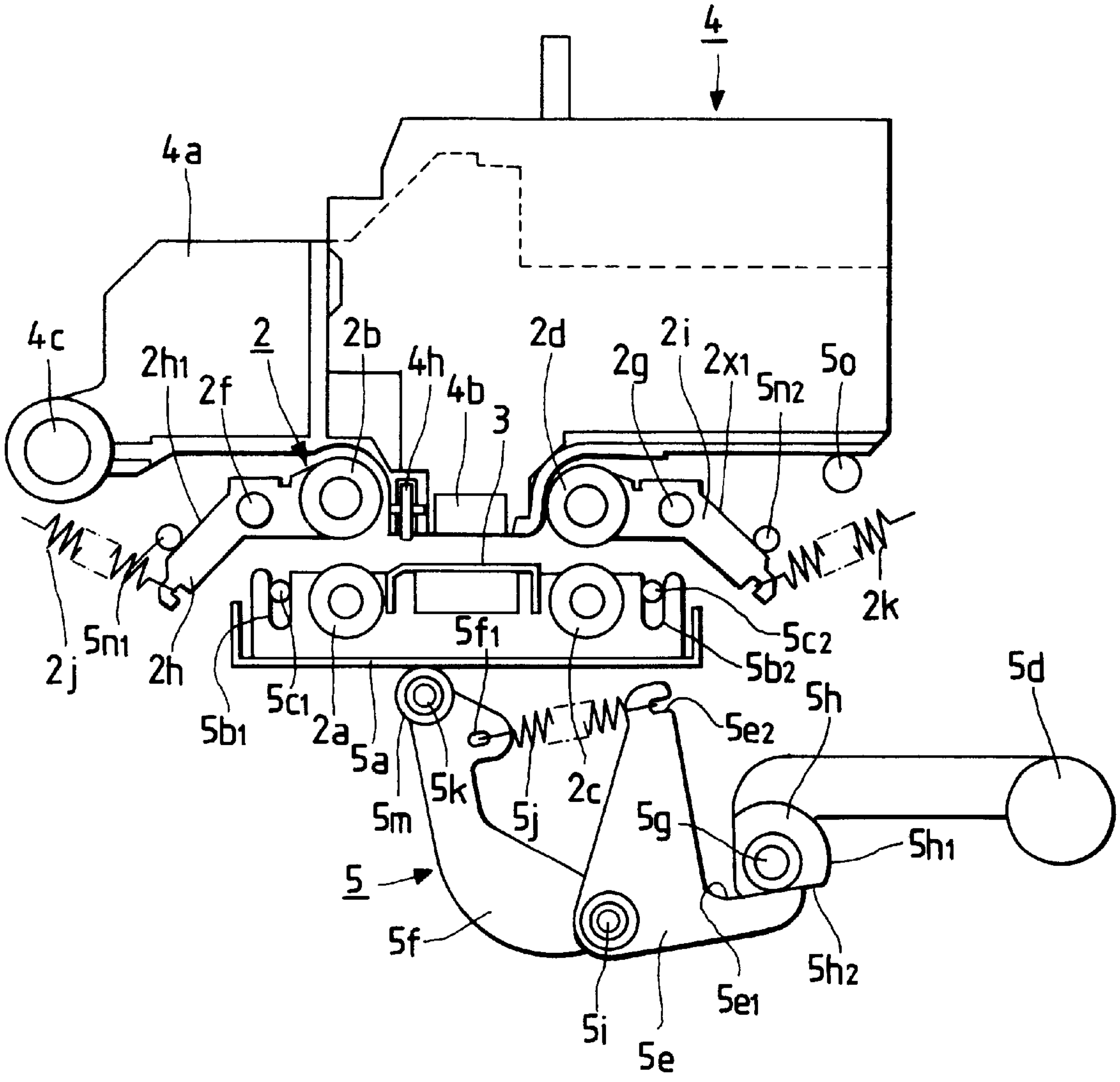
FIG. 3 is an explanatory cross-sectional view showing a state where a recording medium is released from a sandwiched state by transporting means of the embodiment, and a platen is separated.

One embodiment will first be described with reference to FIGS. 1–3. FIG. 1 is an explanatory cross-sectional view showing a main portion of a recording apparatus; FIG. 2 is an explanatory perspective view; and FIG. 3 is an explanatory cross-sectional view showing a state where a recording medium is released from being sandwiched by transporting means with a platen being separated from the recording medium.

[General Explanation]

This recording apparatus, as shown in FIG. 2, sandwiches a fed recording medium 1 such as paper or plastic sheet by transporting means 2 to transport the recording medium 1 in the direction indicated by arrow a, and reciprocally moves recording means 4 relative to the recording medium 1 having its rear surface supported by a platen 3 to perform recording on the recording medium 1, and discharges the thus recorded recording medium 1 to a discharging tray, not shown.

When a jam is treated in this recording apparatus, a releasing means 5 is used to separate the platen 3 relative to the recording means 4, and the sandwiching of the recording medium 1 by the transporting means 2 is released.

Next, the foregoing each of sections will be specifically described.

[Transporting means]

Although the transporting means 2 is provided mainly for transporting the recording medium 1, it has another function as a cramping means for cramping the recording medium 1 in a sandwiched state during a recording operation. As shown in FIGS. 1 and 2, the transporting means 2 is disposed at a location upstream of a recording position in the transporting direction of the recording medium 1, and comprises a pair of transporting rollers 2*a*, 2*b* for sandwiching and transporting the recording medium 1 to the recording position, and a pair of discharging rollers 2*c*, 2*d*, disposed at a location downstream of the recording position for discharging the recorded recording medium 1 to a discharging tray. The transporting lower roller 2*a* and the discharging lower roller 2*c* are coupled to a transporting motor 2*e* and rotated by the same, while the transporting upper roller 2*b* and the discharging upper roller 2*d* are rotatably attached at one end of a transporting arm 2*h* and a discharging arm 2*i*, respectively, which are pivotable on shafts 2*f*, 2*g*, respectively. Tension springs 2*j*, 2*k* engaged at the other ends of the arms 2*h*, 2*i* press the transporting and discharging upper rollers 2*b*, 2*d* to be in contact with the transporting and discharging lower rollers 2*a*, 2*c*, respectively. With this structure, when the transporting motor 2*e* is driven, the recording medium 1 is sandwiched between and transported by the transporting roller pair 2*a*, 2*b* and the discharging roller pair 2*c*, 2*d*.

[Recording Means]

The recording means 4 records an ink image on the recording medium 1 which is transported by the transporting means 2. The apparatus of this embodiment employs a serial-type ink jet recording method, wherein a carriage 4*a* is reciprocally moved while a recording head 4*b* discharges liquid ink for recording.

The carriage 4*a* is mounted so as to be slidable along and pivotable on a guiding rail 4*c* which is disposed in the width direction of the recording medium 1 (the direction perpendicular to the transporting direction of the recording medium 1). Further, in the vicinity of both ends of the guiding rail 4*c*, there are disposed a driving pulley 4*d* and a dependent pulley 4*e*. An endless timing belt 4*f* passed about both pulleys 4*d*, 4*e* is connected to the carriage 4*a*. Therefore, when the carriage motor 4*g* coupled to the driving pulley 4*c* is driven in the forward and backward directions, the carriage 4*a* reciprocally moves guided by the guiding rail 4*c*.

On the carriage 4*a*, there is mounted a recording head assembly 4*b* which is integrated with an ink cartridge. This ink head assembly 4*b* comprises four heads 4*b*1, 4*b*2, 4*b*3 and 4*b*4 respectively integrated with cartridges containing yellow, magenta, cyan and black ink. The recording head assembly 4*b* discharges ink in respective colors in response, to an image signal, while the carriage 4*a* reciprocally moves, to perform color recording on the recording medium 1.

The recording head assembly 4*b* comprises fine liquid discharging ports, a liquid pathway, an energy acting portion formed in part of this liquid pathway, and an energy generating means for generating energy which is acted on a liquid in the acting portion to form liquid droplets. For example, there are a recording method employing an electromechanical transducer such as a piezo element, a recording method employing an energy generating means which generates heat by irradiating an electro-magnetic wave such as a laser and discharges liquid droplets by the action of the heat generation; a recording method employing an energy generating means which heats a liquid by an electro-thermal transducer such as a heat generating element having a heat generating resistor or the like to discharge the liquid, and so on. Among these recording methods, a recording head employed in an ink jet recording method which discharges a liquid by thermal energy can be provided with highly densely aligned liquid discharging ports (orifices) for forming liquid droplets to be discharged, whereby recording in high resolution is achieved. Above all, a recording head which employs an electro-thermal transducer as an energy generating means is advantageous because this type of recording head can be readily reduced in size, sufficiently utilize the advantages of the IC technology and micro machining technique in which the technological advance and reliability have been remarkably improved in the recent semiconductor field, and be easily mounted in a high density with a lower manufacturing cost.

[Platen]

The platen 3 supports the recording medium 1 from the rear surface thereof at the recording position, and the platen plane is positioned at a height substantially equal to that of the transporting plane of the recording medium 1 transported by the transporting means 2.

In the ink jet recording method, it is necessary to reduce the distance between the recording medium 1 and the recording head assembly 4 as short as possible in order to ensure the impact accuracy of discharged ink. For this reason, the distance between the platen 3 and the recording head assembly 4 is set to be a small value. In this embodiment, a rotatable roller 4*h* is mounted at a position opposite to the platen 3 in the carriage 4*a* as shown in FIG. 1. The carriage 4*a* is rotatable around the guiding rail 4*c*, and due to the weight of the carriage 4*a* a force in the clock-wise direction in FIG. 2 acts on the carriage 4*a*. By a rolling contact of the roller 4*h* with the platen 3 or that of the roller 4*h* with the recording medium 1 on the platen 3, the position of the carriage 4*a* in the rotating direction is determined, and the distance between the recording head 4*a* and the platen 3 is defined.

[Releasing Means]

The releasing means 5 separates the platen 3 away from the ink discharging plane of the recording head assembly 4*b* and releases the recording medium 1 sandwiched between the transporting means 2. In this embodiment, as shown in FIG. 1, the transporting lower roller 2*a*, the discharging lower roller 2*c* and the platen 3 are mounted on an elevator stand 5*a* which makes them movable in the vertical direction.

At both ends of the elevator stand 5*a* there are formed guiding grooves 5*b*1, 5*b*2 in the vertical direction, in which fitted are guiding pins 5*c*1, 5*c*2, respectively, which are secured at fixed positions of the apparatus body. Thus, the elevator stand 5*a* can rise and fall in the vertical direction being guided by these guiding grooves 5*b*1, 5*b*2 and the guiding pins 5*c*1, 5*c*2.

Manipulation of a lever 5*d* causes the elevator stand 5*a* to rise and fall through an intermediate arm 5*e* and a lifting arm 5*f*. The lever 5*d* is pivotably supported on a lever shaft 5*g* secured on the apparatus body. A cam 5*h* is also secured integrally with the lever 5*d* so as to be pivotable on the lever shaft 5*g* together with the lever 5*d*. This cam 5*h* has a cam face (a larger diameter portion) 5*h*1 on an arc spaced from the center of the lever shaft 5*g* by a large distance and a cam face (a smaller diameter portion) 5*h*2 spaced by a shorter distance from the center of the lever shaft 5*g*.

The intermediate arm 5*e* is pivotably supported by an arm shaft 5*i* secured on the apparatus body, where a cam follower face 5*e*1 formed at one end thereof is located to be contactable with the cam 5*h*, and is applied with a pivoting force from the cam 5*h*. The other end of the intermediate arm 5*e* is formed with a hook 5*e*2 which is engaged with one end of a tension spring 5*j*.

The lifting arm 5*f* is pivotably supported by an arm shaft 5*k*, where an engaging hole 5*f*1 formed therethrough in an upper right portion is engaged with the other end of the tension spring 5*j*, and the upper end thereof pivotably supports an urging roller 5*m*.

In a state where the transporting roller pair 2*a*, 2*b* and the discharging roller pair 2*c*, 2*d* are pressed to each other, a stopper pin 5*n*1 is secured on the apparatus body spaced by a slight distance from an edge 2*h*1 in an upper left end portion of the transporting arm 2*h*, and a stopper pin 5*n*2 is secured on the apparatus body spaced by a slight distance from an edge 2*i*1 in an upper right end portion of the discharging arm 2*i*. Further, on the lower right side of the carriage 4*a*, a-stopper shaft 5*o* is secured on the apparatus body spaced by a slight distance from the carriage 4*a* and in parallel to the guiding rail 4*c*.

In the foregoing structure of the releasing means 5, if the lever 5*d* has been switched to a position shown in FIG. 1 during a normal recording operation, the large diameter portion 5*h*1 of the cam 5*h* pushes down the cam follower face 5*e*1, while the urging roller 5*m* pushes up the elevator stand 5*e* through the elasticity of the tension spring 5*j*. In this event, the elevator stand 5*a* is positioned by the guiding pins 5*c*1, 5*c*2 which are brought into contact with the lower ends of the guiding grooves 5*b*1, 5*b*2. By this operation, the transporting roller pair 2*a*, 2*b* and the discharging roller pair 2*c*, 2*d* are pressed to each other, and the recording head assembly 4*b* faces the platen 3 with a predetermined distance therebetween. In this condition, if the transporting motor 2*e* and the carriage motor 4*g* are driven and the recording head assembly 4*b* is driven in response to an image signal, the recording medium 1 is intermittently transported while an image is recorded on the recording medium 1.

On the other hand, if an abnormal transporting arises during a recording operation, a control means provided in the apparatus body, after detecting a signal indicative of the abnormality, stops all operating systems and informs the operator of the abnormality by an alarming display or the like. When the operator is to perform a jam treatment in response to this, the lever 5*d* is rotated in the counter-clockwise direction to the position as shown in FIG. 3. The elevator stand 5*a*, guided by the guiding pins 5*c*1, 5*c*2, vertically falls by the weight, which acts on the urging roller 5*m* supported by the lifting arm 5*f*. A rotating force thus acts on the lifting arm 5*f* in the counter-clockwise direction. Simultaneously, a rotating force acts on the intermediate arm 5*e* in the counter-clockwise direction through the tension spring 5*j*. Therefore, the rotation of the lever 5*d* in the counter-clockwise direction causes the cam face in contact with the cam follower face 5*e*1 of the intermediate arm 5*e* to change from the large diameter portion 5*h*1 to the small diameter portion 5*h*2, whereby the intermediate arm 5*e* is released from the forced rotation in the counter-clockwise direction. Consequently, the intermediate arm 5*e* and the lifting arm 5*f* rotate in the counter-clockwise direction, which leads to lowering of the urging roller 5*m*, and the elevator stand 5*a* responsively falls.

With the falling of the elevator stand 5*a*, the transporting arm 2*h* supporting the transporting upper roller 2*a* rotates in the clockwise direction by the action of the spring 2*j*, whereas the discharging arm 2*i* supporting the discharging upper roller 2*c* rotates in the counter-clockwise direction by the action of the spring 2*k*. However, the rotations are restricted at the time the respective arms 2*j*, 2*i* come in contact with the stopper pins 5*n*1, 5*n*2, respectively. For this reason, the transporting lower roller 2*a* and the discharging lower roller 2*c* are lowered and separated from the transporting upper roller 2*b* and the discharging upper roller 2*d*, respectively, whereby the recording medium 1 sandwiched therebetween is released. The jammed recording medium 1 can be easily removed in this manner.

With the falling of the elevator stand 5*a*, the carriage 4*a* rotates around the guiding rail 4*c* in the clockwise direction, however, this rotation is restricted at a time the carriage 4*a* comes in contact with the stopper shaft 5*o*. For this reason, a relative distance between the falling platen 3 and the recording head assembly 4*b* becomes larger, so that the ink discharging plane of the recording head assembly 4*b* will never be rubbed by the recording medium 1 during a jam recovery treatment, thereby preventing the recording head assembly 4*b* from being damaged. In the recording apparatus of this embodiment, when the lever 5*d* of the releasing means 5 is manipulated as described above, the recording medium 1 sandwiched between the transporting means 2 is released, and the recording head 4*b* is separated from the platen 3, making it possible to facilitate a jam recovery treatment.

Figure 4:
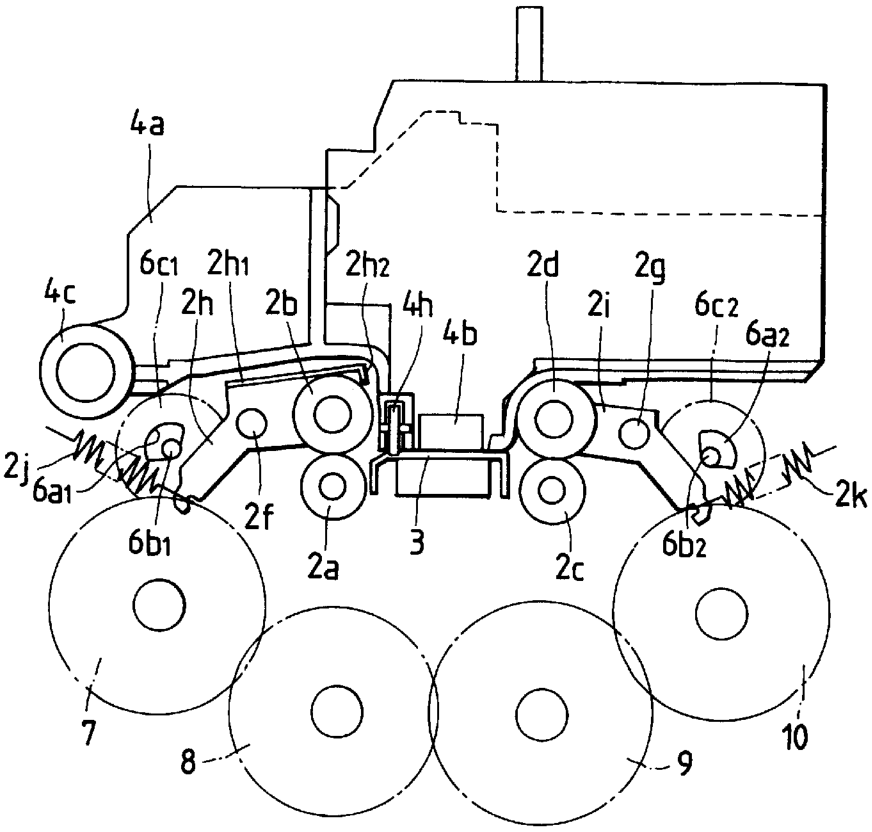
FIG. 4 is a cross-sectional view for explaining a main portion of a recording apparatus according to another embodiment.
Figure 5:
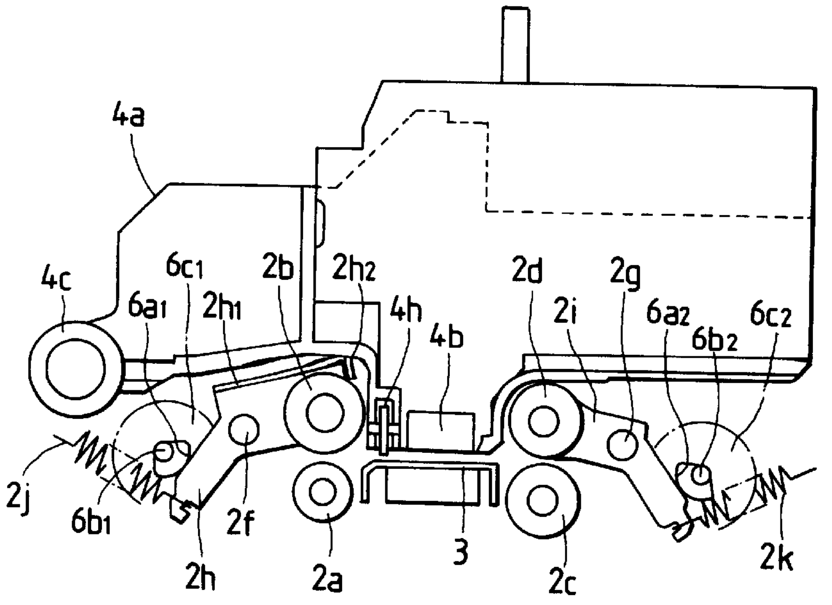
FIG. 5 is an explanatory cross-sectional view showing a state where a recording medium is released from a sandwiched state by transporting means of the other embodiment, and a platen is separated.
Figure 6:
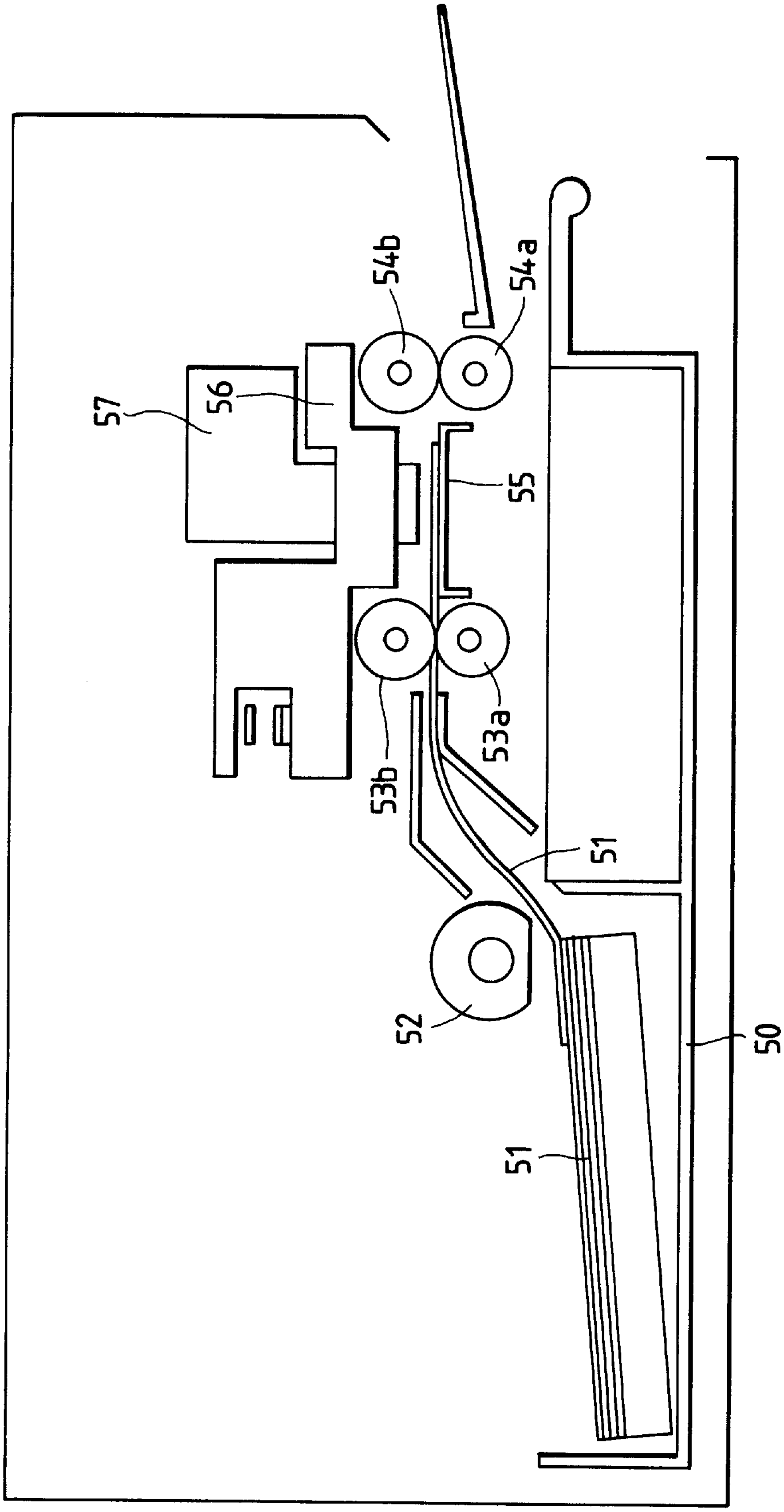
FIG. 6 is a diagram for explaining a prior art apparatus.

Next, another embodiment having releasing means of a different structure will be described with reference to FIGS. 4 and 5. FIG. 4 is a cross-sectional view for explaining a main portion of a recording apparatus according to this embodiment; and FIG. 5 is an explanatory cross-sectional view showing a state where releasing means is operated to perform a jam recovery treatment. Members in these drawings having similar functions to those in the foregoing embodiment are designated the same reference numerals.

Referring to FIG. 4, a transporting lower roller 2*a* and a discharging lower roller 2*c* are rotatably supported at fixed position of the apparatus body, and coupled to a motor, not shown, to be applied with a rotating force. Between these rollers 2*a*, 2*c*, a platen 3 is disposed. A transporting arm 2*h* is pivotable on an arm shaft 2*f* secured on the apparatus body and rotatably supports a transporting upper roller 2*b* at the right end thereof. Also, at the left end of the transporting arm 2*h* one end of a tension spring 2*j* is engaged. The other end of the tension spring 2*j* is secured at a fixed position on the apparatus body to apply the transporting arm 2*h* with a rotating force in the clockwise direction, whereby the transporting upper roller 2*b* is pressed to the transporting lower roller 2*a*.

The transporting arm 2*h* has, on the upper arm side thereof, an even portion 2*h*1 parallel to the axial direction of the transporting lower roller 2*a*, which is integrated with a second transporting arm, not shown, which is at a position symmetric to the position of the transporting arm 2*h* on the other end side in the axial direction of the transporting lower roller 2*a* and supports the transporting lower roller 2*a*.

A bent portion 2*h*2 at the right end of the even portion 2*h*1 is spaced close to the lower surface of the carriage 4*a*, such that, assuming that the transporting arm 2*h* is rotated around the arm shaft 2*f* in the counter-clockwise direction, the bent portion 2*h*2 pushes up the carriage 4*a*.

A discharging arm 2*i* is pivotable on an arm shaft 2*g* secured on the apparatus body and rotatably supports the discharging upper roller 2*d* at the left end thereof. Also, the discharging arm 2*i* has at the right end thereof a hook to which one end of a tension spring 2*k* is engaged. The other end of the tension spring 2*k* is secured at a fixed position on the apparatus body and applies the discharging arm 2*i* with a rotating force in the counter-clockwise direction, whereby the discharging upper roller 2*d* is pressed to the discharging lower roller 2*c*.

A first cam 6*a*1 is rotatable integrally with a cam shaft 6*b*1. A large diameter portion of the cam 6*a*1 is positioned such that it can be engaged with an upper edge of a lower arm of the transporting arm 2*h* when a predetermined rotating amount is applied to the cam shaft 6*b*1. On the other hand, a second cam 6*a*2 located on the discharging side is rotatable integrally with a cam shaft 6*b*2. A large diameter portion of the cam 6*a*2 is positioned such that it can be engaged with an upper edge of a lower arm of the discharging arm 2*i* when a predetermined rotating amount is applied to the cam shaft 6*b*2.

The cam shafts **6*b*1, 6*b*2 are coupled to gears 6*c*1, 6*c*2, respectively, outside the transporting area of the recording medium 1. Both gears 6*c*1, 6*c*2 are operatively meshed with each other by way of gears 7, 8, 9 and 10** in a manner that they are associated with their phases of rotating angles related to each other. For example, if the operator rotates a lever, not shown, which is coupled with any of the foregoing gears, a rotating amount applied to the lever is transmitted through the train of gears.

In the above-mentioned structure, for performing a jam recovery treatment, when the operator manipulates a lever, not shown, to rotate the cam shafts **6*b*1, 6*b*2 to rotate the cams 6*a*1, 6*a*2 substantially over 180° from the state shown in FIG. 4, the large diameter portions of the cams 6*a*1, 6*a*2 engage with the upper edges of the lower arms of the arms 2*h*, 2*i*, respectively, with the result that the transporting arm 2*h* is rotated in the counter-clockwise direction while the discharging arm 2*i* is rotated in the 1clockwise direction. Further, the upper bent portion 2*h*2 of the transporting arm 2*h* pushes up the lower surface of the carriage 4*a* which in turn is rotated around the guiding rail 4*c* in the counter-clockwise direction, whereby the distance between the platen 3 and the recording head assembly 4*b* becomes wider. The operator, therefore, can easily remove the recording medium 1 which has been sandwiched between the rollers 2*a*, 2*b* and 2*c*, 2*d* without damaging the recording head assembly 4*b***.

Although this embodiment has shown an example where the lever **5*d* is manually rotated, the lever 5*d*** may be coupled to a motor or the like to be electrically driven.

Also, the above described embodiments each have shown an example, where the recording medium 1 sandwiched by the roller pairs constituting the transporting means 2 is released, however, the clamping of the recording medium made by alternative sandwiching mechanism or pressing mechanism may also be released by the releasing means.

Although in the foregoing embodiments, the ink jet recording method has been employed for the recording means, it is further preferable that the recording means is constructed in a manner that an electro-thermal transducer is conducted in accordance with a recording signal, and ink is discharged from discharging ports to perform recording by the growth of bubbles generated by heating of the electro-thermal transducer exceeding film boiling.

The typical structure and principle of this type of recording apparatus preferably employ the basic principles disclosed, for example, in U.S. Pat. Nos. 4,723,129 and 4,740,796. This recording system is applicable to either of so-called on-demand type and continuous type. Particularly, this recording system is effective in the on-demand type, where an electro-thermal transducer arranged corresponding to a sheet and a liquid pathway, in which ink is held, is applied with at least one driving signal corresponding to recording information for giving a rapid temperature rise to ink to exceed nucleate boiling and cause film boiling, whereby thermal energy is generated to cause film boiling on a heat acting face of a recording head, and consequently, bubbles which correspond one by one to the driving signal applied to the electro-thermal transducer can be formed in the ink. The ink is discharged from discharging orifices by the action of growth and contraction of bubbles to form at least one droplet. It is preferable that a pulse signal is used as the driving signal because the growth and contraction of bubbles are immediately and properly performed by such a pulse-shaped driving signal, whereby particularly excellent ink discharge can be achieved.

As this pulse-shaped driving signal, those described in the specifications of U.S. Pat. Nos. 4,463,359 and 4,345,262 are suitable.

Further, if conditions described in the specification of U.S. Pat. No. 4,313,124 concerning a temperature rising ratio on the heat acting face are employed, further excellent recording can be achieved.

It should be noted that the structure of the recording head according to the present invention includes such one that employes structures described in the specifications of U.S. Pat. Nos. 4,558,333 and 4,459,600 which disclose a structure in which a heat acting portion is arranged in a bent region, in addition to a combined structure (a straight flow pathway or a perpendicular flow pathway) formed of discharging orifices, a liquid pathway and an electro-thermal transducer as disclosed in the above-mentioned respective specifications.

Additionally, the present invention is also effective when the recording head is constructed on the basis of Japanese Laid-open Patent Application No. 59-123670 which discloses a structure where common slits serve as discharging orifices for a plurality of electro-thermal transducers and Japanese Laid-open Patent Application No. 59-138461 which discloses a structure where an opening for absorbing a pressure wave of thermal energy is arranged corresponding to a discharging section. After all, the present invention ensures to perform efficient recording irrespective of the shape of the recording head.

The present invention is also applicable to a recording head of full line type which has a length corresponding to the width of the widest recording medium on which a recording apparatus can record.

This full line head may be constituted by either an assembly of a plurality of recording heads extending over the full line length or a single integrated full-line recording head.

Additionally, the present invention may also employ an exchangeable chip-type recording head to which electric connection with the recording apparatus and ink supply from the recording apparatus are enabled by mounting the head in the recording apparatus, or a cartridge type recording head which has an ink tank integrated therewith.

Also, the addition of a recovering means for a recording head, a preparatory supporting means and so on, which may be provided as constituents of the recording apparatus of the present invention, is preferable since the effect of the present invention can be further stabilized by these means. Specifically, these means may be a capping means; a cleaning means; a pressurizing or sucking means; and a preparatory heating means comprising an electro-thermal transducer or an alternative heating element, or a combination of these two elements. It is also effective for stable recording to perform a preparatory discharging mode which executes discharging other than that for the recording purpose.

Further, as to the kind and number of recording heads mounted on the carriage, the recording apparatus of the present invention may be provided with, for example, a plurality of recording heads corresponding to a plurality of inks respectively having different colors and concentrations, or other than a single recording head corresponding to single color ink. More specifically, the recording mode for the recording apparatus may be either of a main color recording mode, in which recording is performed only in a main color such as black, and a combined color mode using a plurality of integrated recording heads. The present invention is also applicable to an apparatus which executes at least one of a plural color recording mode using different colors and a full color recording mode achieved by mixing different colors.

In the foregoing embodiments of the present invention, although ink was explained as a liquid, the ink may be such one that is solidified at temperatures less than room temperatures and softened or liquified at room temperatures. Alternatively, since the ink jet recording apparatus generally controls the temperature of ink in a range between 30° C. and 70° C. to maintain the viscosity of the ink in a stably dischargeable state, any ink may be used as long as it is in a liquid state when a recording signal is supplied. Further, it is possible to employ ink, which is solid in an unused state, for the purpose of preventing an excessive temperature rise of ink or preventing the ink from evaporating due to thermal energy by positively utilizing the thermal energy to change ink from a solid state to a liquid state. After all, the present invention is applicable to the use of ink having the characteristics of being liquified only by applying thermal energy thereto, e.g., ink which is liquified and discharged by applying thereto, thermal energy in response to a recording signal, ink which has already begun, solidifying when reaching a recording medium, and so on.

The ink for these cases may be such one that is stored in liquid or solid state within cavities or through holes in a porous sheet and arranged opposite to an electro-thermal transducer, as described in Japanese Patent Laid-open Application No. 54-56847 or 60-71260. The most effective apparatus for the above-mentioned respective ink is the one which executes the foregoing film boiling method.

The foregoing ink jet recording apparatus may form, other than that used as an image outputting terminal for an information processing apparatus such as a computer, a copier combined with a reader or the like, a facsimile apparatus having transmitting and receiving functions, and so on.

Although explanation has been given to an example where the ink jet recording method is employed for a recording means, the present invention is not necessarily limited to the ink jet recording method but can be applicable to a thermal transfer recording method, a heat sensitive recording method, and recording methods other than the impact recording method such as a wire dot recording method. The present invention need not be limited either to a serial recording method but may employ a so-called line recording method.

According to the above described embodiments, for performing a jam recovery treatment or the like, the platen is separated from the recording means by the releasing means and a recording medium is released from a sandwiched state by a transporting means functioning as a clamping means. This operation facilitates a jam recovery treatment for recording medium as well as prevents the recording means from being damaged by the recording medium.

As described above, the present invention provides a releasing means for separating a recording means from a platen and releasing a recording medium from a clamped state, as described above, so that if a jammed recording medium is to be treated, by way of example, the operator can easily removed the jammed recording medium without damaging the recording means.

What is claimed is:

1. An ink jet recording apparatus for recording on a recording medium using an ink jet recording head assembly held in non-contact with the recording medium at a recording area, said apparatus comprising:

a platen supporting the recording medium located at the recording area so that the recording medium is in non-contact with an ink discharge port of said ink jet recording head assembly;

a conveying mechanism provided upstream of the recording area with respect to a conveying direction of the recording medium to guide the recording medium to the recording area, said conveying mechanism comprising conveying rollers for pinching and conveying the recording medium and contacting a surface of the recording medium to said platen;

an exhausting mechanism provided downstream of the recording area with respect to the conveying direction of the recording medium to exhaust the recording medium from the recording area, said exhausting mechanism comprising exhausting rollers for pinching and conveying the recording medium and contacting the surface of the recording medium to said platen;

a movable unit holding one of said conveying rollers, one of said exhausting rollers and said platen, said movable unit being movable between a recording position where the recording medium is recorded by the ink jet recording head assembly and a non-recording position displaced apart from the recording position with respect to the ink jet recording head assembly, at which a pinched condition of said conveying mechanism and said exhausting mechanism is released; and moving means for moving said movable unit between the recording position and the non-recording position and holding said movable unit at the non-recording position at a predetermined distance between the ink jet recording head assembly and said platen, said movable unit comprising a plurality of slots, said slots being linear and extending in a direction away from said ink jet recording head assembly, and a plurality of fixed pins in line with said slots, each pin for engaging with one of said plurality of slots, said slots being closed at an end opposed to the conveyance route and extending from the closed end toward the conveyance and route.

2. An ink jet recording apparatus according to claim 1, wherein said moving means comprises a lever for moving said movable unit.

3. An ink jet recording apparatus according to claim 1, wherein said ink jet recording head assembly comprises a plurality of ink jet recording heads, said recording heads each storing ink of a different color used for recording on the recording medium supported by said platen.

4. An ink jet recording apparatus according to claim 1, further comprising a head holding section for holding the ink jet recording head assembly and means for positioning said conveying rollers and said exhausting rollers independently of said head holding section.

* * * * *

UNITED STATES PATENT AND TRADEMARK OFFICE

CERTIFICATE OF CORRECTION

PATENT NO. : 6,005,593

DATED : December 21, 1999

INVENTOR(S) : YOSHINAGA ET AL.

It is certified that error appears in the above-identified patent and that said Letters Patent is hereby corrected as shown below:

COVER PAGE:
The following should be deleted:
"[*] Notice: This patent issued on a continued prosecution application filed under 37 CFR 1.53(d), and is subject to the twenty year patent term provisions of 35 U.S.C. 154(a)(2)."

[56] References Cited:
FOREIGN PATENT DOCUMENTS, "59123670" should read --59-123670--.

COLUMN 1:
Line 39, "arises:" should read --arise:--.

COLUMN 2:
Line 55, "Next," should read --Next, each of--, and "each of" should be deleted.

COLUMN 3:
Line 44, "ports," should read --ports (orifices),--.
Line 53, "tion;" should read --tion,--.

COLUMN 4:
Line 37, "fitted are" should read --are fitted--.
Line 40, "being" should read --while being--.

COLUMN 5:
Line 5, "a-stopper" should read --a stopper--.
Line 33, "as" should be deleted.
Line 65, "direction," should read --direction;--.

UNITED STATES PATENT AND TRADEMARK OFFICE

CERTIFICATE OF CORRECTION

PATENT NO. : 6,005,593

DATED : December 21, 1999

INVENTOR(S) : YOSHINAGA ET AL.

It is certified that error appears in the above-identified patent and that said Letters Patent is hereby corrected as shown below:

<u>COLUMN 7</u>:
Line 17, "1clockwise" should read --clockwise--.
Line 32, "released," should read --released;--.

<u>COLUMN 8</u>:
Line 7, "employes" should read --employs--.
Line 57, "other than" should be deleted.

<u>COLUMN 9</u>:
Line 16, "thereto," should read --thereto--.
Line 17, "begun," should read --begun--.
Line 20, "through holes" should read --throughholes--.
Line 55, "removed" should read --remove--.

<u>COLUMN 10</u>:
Line 44, "conveyance and route." should read --conveyance route.--.

Signed and Sealed this

Twenty-seventh Day of March, 2001

Attest:

NICHOLAS P. GODICI

Attesting Officer

*Acting Director of the United States Patent and Trademark Office*